(12) United States Patent
Bales (10) Patent No.: US 7,246,168 B1
(45) Date of Patent: Jul. 17, 2007

(54) TECHNIQUE FOR IMPROVING THE INTERACTION BETWEEN DATA LINK SWITCH BACKUP PEER DEVICES AND ETHERNET SWITCHES

(75) Inventor: Scott Bales, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/195,933

(22) Filed: Nov. 19, 1998

(51) Int. Cl.
*G06F 15/16* (2006.01)

(52) U.S. Cl. .................... 709/228; 709/245; 370/389

(58) Field of Classification Search ........ 709/227–228, 709/245, 224; 370/389, 392
See application file for complete search history.

(56) References Cited

U.S. PATENT DOCUMENTS

| | | | |
|---|---|---|---|
| 4,864,559 A | 9/1989 | Perlman | 370/60 |
| 5,018,137 A | 5/1991 | Backes et al. | 370/85.13 |
| 5,027,350 A | 6/1991 | Marshall | 370/85.13 |
| 5,088,032 A | 2/1992 | Bosack | 395/200 |
| 5,331,637 A | 7/1994 | Francis et al. | 370/54 |
| 5,353,283 A | 10/1994 | Tsuchiya | 370/60 |
| 5,361,256 A | 11/1994 | Doeringer et al. | 370/60 |
| 5,394,402 A | 2/1995 | Ross | 370/94.1 |
| 5,414,704 A | 5/1995 | Spinney | 370/60 |
| 5,442,633 A | 8/1995 | Perkins et al. | 370/94.1 |
| 5,500,860 A | 3/1996 | Perlman et al. | 370/85.13 |
| 5,511,168 A | 4/1996 | Perlman et al. | 395/200.15 |
| 5,583,996 A | 12/1996 | Tsuchiya | 395/200.15 |
| 5,600,644 A | 2/1997 | Chang et al. | 370/404 |
| 5,612,959 A | 3/1997 | Takase et al. | 370/390 |
| 5,617,421 A | 4/1997 | Chin et al. | 370/402 |
| 5,633,858 A | 5/1997 | Chang et al. | 370/255 |
| 5,633,866 A | 5/1997 | Callon | 370/397 |
| 5,684,800 A | 11/1997 | Dobbins et al. | 370/401 |
| 5,740,171 A | 4/1998 | Mazzola et al. | 370/392 |
| 5,742,604 A | 4/1998 | Edsall et al. | 370/401 |
| 5,764,636 A | 6/1998 | Edsall | 370/401 |
| 5,796,732 A | 8/1998 | Mazzola et al. | 370/351 |
| 5,796,740 A | 8/1998 | Perlman et al. | 370/401 |
| 5,818,842 A | 10/1998 | Burwell et al. | 370/397 |
| 5,828,844 A | 10/1998 | Civanlar et al. | 395/200.58 |
| 5,898,686 A | 4/1999 | Virgile | 370/381 |
| 5,909,441 A | 6/1999 | Alexander, Jr. et al. | 370/395 |

(Continued)

OTHER PUBLICATIONS

*Cisco Catalyst Workgroup Switch Version 3.0*, web, http://www.cisco.com/warp/public/558/16.html, pp. 1-5.

(Continued)

*Primary Examiner*—Abdullahi Salad
(74) *Attorney, Agent, or Firm*—Cesari and McKenna LLP (57) ABSTRACT

A technique improves the interaction between a backup remote data link switch (DLSw) device coupled to a remote: subnetwork having an Ethernet switch and a local DLSw device coupled to a local subnetwork of a DLSw network. When the backup remote DLSw device accepts a DLSw peer connection with the local DLSw device, the remote device uses configuration information to determine which end stations it can reach through the peer connection. The remote DLSw device then generates one or more test frames having the medium access control (MAC) addresses of those reachable stations as source MAC addresses. The test frames are sent through the Ethernet switch to force the switch to immediately update its forwarding table with the port identifier of the port receiving the incoming frames, along with the source MAC addresses of those frames.

25 Claims, 3 Drawing Sheets

U.S. PATENT DOCUMENTS 5,909,550 A  6/1999  Shankar et al. ........ 395/200.57
6,049,825 A * 4/2000  Yammamoto ................ 709/221
6,188,759 B1 * 2/2001  Lorenzen et al. ........... 379/220

OTHER PUBLICATIONS

Cisco VLAN Roadmap, web, http://www.cisco.com/warp/public/538/7.html, pp. 1-9.

IAC (SM) Newsletter Database (TM) Communications Industry Researchers, Broadband Networks and Applications, copyright 1995 Information Access Company, a Thomson Corporation Company, Section No. 16, vol. E; ISSN: 1059-0544, Headline, *Cisco Announces New Fast Ethernet Interface*, pp. 2-3.

IAC (SM) Newsletter Database (TM) Communications Industry Researchers, Broadband Networks and Applications, copyright 1995 Information Access Company, a Thomson Corporation Company, Section No. 16, vol. 3; ISSN: 1059-0544, Headline, *Cisco Announces Token-Ring Switching Products*, pp. 4-5.

*Cisco 7000 Series Gains Fast Ethernet Interface, Becomes Only Router Family to Support Three High-Speed Network Types*, web, http://www.cisco.com/warp/public/146/199.html pp. 1-2.

*ISL Functional Specification*, web, http://www.cisco.com/warp/public/741/4.htm, pp. 1-4.

*Cisco-Catalyst 5000 Software Release 2.1 Feature Set*, web, http://www.cisco.com/warp/public/729/c5000/426__pp.htm, pp. 1-9.

*IEEE Standard Project P802.1Q, Draft Standard for Virtual Bridged Local Area Networks*, Copyright by the Institute of Electrical and Electronics Engineers, Inc., Feb. 28, 1997, pp. 1-88.

*Draft Standard P. 802.1Q/D10, IEEE Standards for Local and Metropolitan Area Networks: Virtual Bridged Local Area Networks*, Copyright by the Institute of Electrical and Electronics Engineers, Inc., Mar. 22, 1997, pp. 1-212.

*ISL Configurations for Cisco IOS and the Catalyst 5000*, web, http://www.cisco.com/warp/public/741/8.html, pp. 1-8.

*Dynamic Inter-Switch Link Protocol*, 2.2 Configuration Note pp. 2-6.

*Virtual LANs*, Catalyst 2820 Series and Catalyst 1900 Series Enterprise Edition Software Configuration Guide, Chapter 2, pp. 2-1-2-49.

*Configuring VTP and Virtual LANs*, Catalyst 5000 Series Software Configuration Guide, Chapter 13, pp. 13-24.

* cited by examiner

TECHNIQUE FOR IMPROVING THE INTERACTION BETWEEN DATA LINK SWITCH BACKUP PEER DEVICES AND ETHERNET SWITCHES

CROSS-REFERENCE TO RELATED APPLICATION

This invention is related to the following copending and commonly assigned U.S. patent application Ser. No. 08/987,899 titled, Backup Peer Pool for a Routed Computer Network by Periasamy et al., filed on Dec. 10, 1997.

FIELD OF THE INVENTION

The present invention relates to computer networks and, more particularly, to a method and apparatus for establishing reliable communication between end stations of local and remote subnetworks interconnected by respective local and remote data link switch (DLSw) peer devices, wherein the remote subnetwork is a switched Ethernet subnetwork.

BACKGROUND OF THE INVENTION

Data communication in a computer network involves the exchange of data between two or more entities interconnected by communication links and subnetworks. These entities are typically software programs executing on hardware computer platforms, which, depending on their roles within the network, may serve as end stations or intermediate stations. Examples of intermediate stations include routers, bridges and switches that interconnect communication links and subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on the data as it passes through each layer, and the layers communicate with each other by means of the predefined protocols. This design permits each layer to offer selected services to other layers using a standardized interface that shields the other layers from the details of actual implementation of the services.

The lower layers of these architectures are generally standardized and implemented in hardware and firmware, whereas the higher layers are usually implemented in the form of software. Examples of such communications architectures include the Systems Network Architecture (SNA) developed by International Business Machines (IBM) Corporation and the Internet communications architecture.

The Internet architecture is represented by four layers termed, in ascending interfacing order, the network interface, internetwork, transport and application layers. The primary internetwork-layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture. Protocol stacks and the TCP/IP reference model are well-known and are, for example, described in Computer Networks by Andrew S. Tanenbaum, printed by Prentice Hall PTR, Upper Saddle River, N.J., 1996.

SNA is a communications framework widely used to define network functions and establish standards for enabling different models of IBM computers to exchange and process data. SNA is essentially a design philosophy that separates network communications into seven layers termed, in ascending order, the physical control layer, the data link control layer, the path control layer, the transmission control layer, the data flow control layer, the presentation services layer, and the transaction services layer. Each of these layers represents a graduated level of function moving upward from physical connections is to application software.

In the SNA architecture, the data link control layer is responsible for transmission of data from one end station to another. Bridges are devices in the data link control layer that are used to connect two or more subnetworks, so that end stations on either subnetwork are allowed to access resources on the subnetworks. Connection-oriented services at the data link layer generally involve three distinct phases: connection establishment, data transfer and connection termination. During connection establishment, a single path or connection, e.g., an IEEE 802.2 Logical Link Control Type 2 (LLC2) connection, is established between the source and destination stations. Once the connection has been established, data is transferred sequentially over the path and, when the LLC2 connection is no longer needed, the path is terminated. Connection establishment and termination are well-known and are described, e.g., in *Computer Networks* by Andrew S. Tanenbaum, printed by Prentice Hall PTR, Upper Saddle River, N.J., 1988.

Data link switching (DLSw) is a forwarding mechanism over an IP backbone WAN, such as the Internet. In traditional bridging, the data link connection is end-to-end, i.e., effectively continuous between communicating end stations. A stream of data frames originating from a source end station on a source LAN traverses one or more bridges specified in the path over the LLC2 connection to a destination station on a destination LAN. In a system implementing DLSw, by contrast, the LLC2 connection terminates at a local DLSw device, e.g., a switch. The DLSw device multiplexes the LLC2 data stream over a conventional TCP transport connection to a remote DLSw device. LLC2 acknowledgement frames used to acknowledge ordered receipt of the LLC2 data frames are "stripped-out" of the data stream and acted upon by the local DLSw device; in this way, the actual data frames are permitted to traverse the IP WAN to their destination while the "overhead" acknowledgement frames required by LLC2 connections for reliable data delivery are kept off the WAN. The LLC2 connections from the source LAN to the local transmitting DLSw device, and from the remote receiving DLSw device to the destination LAN, are entirely independent from one another. Data link switching may be further implemented on multiprotocol routers capable of handling DLSw devices as well as conventional (e.g., source-route bridging) frames. The DLSw forwarding mechanism is well-known and described in detail in Wells & Bartky, *Request for Comment (RFC) 1795* (1995).

An example of a DLSw network arrangement may comprise one or more local DLSw devices connected to a local subnetwork having a host mainframe or server computer and a remote DLSw device connected to a remote subnetwork having remote end stations or client computers. Each DLSw device establishes a "peer" relationship to the other DLSw device in accordance with a conventional Capabilities Exchange message sequence defined by RFC 1795, and the logical and physical connections between these devices connect the subnetworks into a larger DLSw network. A problem with this arrangement is that any disruption in the remote DLSw device results in the loss of connectivity of the remote subnetwork to the larger network.

Network system administrators have attempted to solve this problem by adding a redundant remote DLSw device to the remote subnetwork. This solution is sufficient as long as the remote subnetwork is of a type that supports source-route bridging (SRB) operations with respect to the contents of a routing information field (RIF) of a frame. If it is, the RIF of each frame is examined by the remote DLSw devices to determine (i) the path followed by the frame through the remote subnetwork and, notably, (ii) which remote device should act on the frame.

DLSw, however, can be used to connect end stations on media that do not implement or support SRB and RIFs; for example, Ethernet is a common technology that does not support the use of RIFs. In the case of a remote Ethernet subnetwork, there is no field in an Ethernet frame that records the route traveled by the frame through the subnetwork, nor is there is an indication of a predetermined route that the frame should travel in the future. Accordingly, implementation of redundant remote DLSw devices on such media may cause problems within the DLSw devices and network.

One such problem results from the fact that DLSw devices typically "learn" the locations of end stations (both locally-reachable and those that can be reached through a remote DLSw peer device) within the network. If a remote DLSw device has learned that a particular station can be reached both "locally" (from the perspective of the remote device) and through its DLSw peer device, an optimal choice is to use the locally-reachable route. Yet there may be multiple remote DLSw devices on the subnetwork, each of which may be forwarding frames received from its DLSw peers; since there are no RIFs in the frames to indicate that they may have previously traversed a DLSw peer connection, a remote DLSw device may mistakenly learn that a particular station is reachable "locally" when, in fact, traffic to this station should actually be sent via the DLSw peer. This results in a loss of data connectivity from the local subnetwork over the DLSw peers.

Another problem arises when a remote end station on the remote subnetwork attempts to establish a communication session with the mainframe computer on the local subnetwork. Each remote DLSw device exchanges conventional Circuit Setup messages with its local DLSw peer device to establish a logical connection circuit. When the local DLSw device establishes two active logical connections with the remote DLSw devices, the local DLSw device interprets the circuits as duplicates caused by error during transmission of the connection establishment messages and destroys both circuits.

System administrators have worked around these problems by configuring one of the remote DLSw devices as a primary remote DLSw device and the other as a backup remote DLSw device. In this arrangement, only one remote DLSw device has an active logical connection with the local DLSw device at any point in time. If the primary remote DLSw device fails, the local DLSw device "destroys" its logical connection with that remote device and establishes a logical connection with the backup remote DLSw device. The local DLSw device continually monitors the status of the primary DLSw remote device and, as soon as this latter device is operational, the local DLSw device "destroys" the logical connection with the backup remote DLSw device and logically reconnects with the primary remote device. An example of such an arrangement is described in a copending and commonly assigned U.S. patent application Ser. No. 08/978,899 titled, Backup Peer Pool for a Routed Computer Network by Periasamy et al., which application is hereby incorporated by reference as though fully described herein. However, this arrangement may cause a further problem when the primary and backup remote devices are connected to an Ethernet switch.

The Ethernet switch is a device with multiple ports for connecting multiple end stations to the larger network. Each port may handle multiple medium access control (MAC) addresses from multiple end stations. The Ethernet switch maintains a forwarding table, which may be implemented as a Content Addressable Memory, to keep track of which ports access certain MAC addresses. As the end stations forward frames through the switch to the network, the switch records the port identifier (ID) of the incoming frames, along with the source MAC addresses of the transmitting end stations, in the forwarding table. The table also stores the port IDs of the ports that connect the switch to the primary and backup remote DLSw devices, together with MAC addresses accessible through those ports.

When the primary remote DLSw device fails, the local DLSw device detects the failure (typically due to a timeout event in the underlying TCP transport connection), terminates the logical connection with the now "inactive" DLSw device and initiates a logical connection with the backup remote DLSw device. However, the Ethernet switch has learned that all local end stations reachable through the local DLSw peer should be forwarded through its port to which the primary remote DLSw device is connected. Hence, frame traffic destined to these local end stations is sent to the inactive DLSw device and, thus, never reaches the local DLSw peer until the corresponding forwarding table entries in the switch "time-out".

When these "old" entries time-out, the Ethernet switch has no currently valid entries for these destination MAC addresses; therefore, the switch "broadcasts" subsequently-received frames destined for the local end stations to all of its ports and, in response to receiving the broadcasted frame, the backup remote DLSw device delivers the frame to its local DLSw peer. When traffic from the local DLSw peer flows through the Ethernet switch, the switch updates its forwarding table with the port ID for the port connecting the backup remote DLSw device, along with the source MAC addresses of incoming frame traffic at that port.

When the primary remote DLSw device comes back "on-line", the local DLSw device (i) recontacts the primary remote DLSw device, (ii) reinitiates a logical connection to that primary device, and (iii) terminates the logical connection with the backup remote DLSw device. Yet, as noted, the Ethernet switch does not forward traffic destined for the local DLSw peer through the port to which the primary remote device is connected until after its forwarding table entries (particularly those specifying the backup path) have timed-out. As a result, when the primary and backup remote DLSw devices are connected to a switched Ethernet LAN, the recovery time associated with transitioning from primary-to-backup device status, and vice versa, is variably increased by the time needed to "purge" old port ID and MAC address entries from the forwarding table of the Ethernet switch.

It should be noted that certain types of device failures may be detectable by an Ethernet switch; these device failures typically cause most commercially-available Ethernet switches to immediately flush all forwarding table entries corresponding to its ports connected to the failed devices. In these cases, the recovery time delay described above may not be observed when transitioning from primary-to-backup status; however, the delay incurred when transitioning from backup-to-primary status is still present as this transition is not triggered by a failure event in the network.

SUMMARY OF THE INVENTION

The present invention relates to a technique for improving the interaction between a backup remote data link switch (DLSw) device coupled to a remote subnetwork having an Ethernet switch and a local DLSw device coupled to a local subnetwork of a DLSw network. According to the inventive technique, the backup remote DLSw device forces the Ethernet switch to update its forwarding table immediately after the backup device replaces a primary remote DLSw device as the active peer to the local DLSw device. The inventive technique further allows the primary remote DLSw device to force the Ethernet switch to update its table immediately after it resumes its role as the active peer to the local DLSw device.

Broadly stated, when either the primary or backup remote DLSw device accepts a DLSw peer connection, it uses configuration information to determine which end stations it can reach through the peer connection. Thereafter, the remote DLSw device generates one or more test frames having the medium access control (MAC) addresses of those reachable stations as source MAC addresses. The remote device sends the test frames through the Ethernet switch; according to the invention, these test frames force the switch to immediately update its forwarding table with the port identifier (ID) of the port receiving the incoming frames, along with the source MAC addresses of those frames. If these latter MAC addresses are previously stored in the table, but associated with a different port ID, then the test frames force the Ethernet switch to purge these previous table entries, thereby substantially reducing overall recovery time by eliminating the delay associated with "timing-out" previous, old entries of the table.

In the illustrative embodiment of the invention, the primary or backup remote DLSw device "learns" about MAC addresses that can be reached through the new peer connection via a MAC Address List control vector of a conventional DLSw Capabilities Exchange message described in RFC 1795. In response to receiving the address list control vector, the primary or backup remote DLSw device generates the test frame for each learned MAC address; for the illustrative embodiment, the test frame is preferably an IEEE 802.2 Logical Link Control Type 1 (LLC1) TEST frame. As noted, the source MAC address of each generated TEST frame is one of these learned MAC addresses, whereas the destination MAC address of the frame is a typical group/multicast address to ensure propagation of the frame throughout the switched Ethernet subnetwork. The primary or backup remote DLSw device sends each TEST frame through the Ethernet switch, thereby forcing the switch to modify its forwarding table in connection with its typical frame forwarding mechanism.

In an alternative embodiment of the present invention, a list of MAC addresses, along with the peer ID of the local DLSw peer device through which these MAC addresses may be reached, are statically configured within configuration files of the primary and backup remote devices by a system administrator. When a DLSw peer connection is established, the appropriate remote DLSw device scans the list of statically-configured MAC addresses to determine whether an address corresponds to the peer ID of the newly-connected DLSw peer. If so, LLC TEST frames are forwarded through the Ethernet switch to force the switch to modify its forwarding table, as described above.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
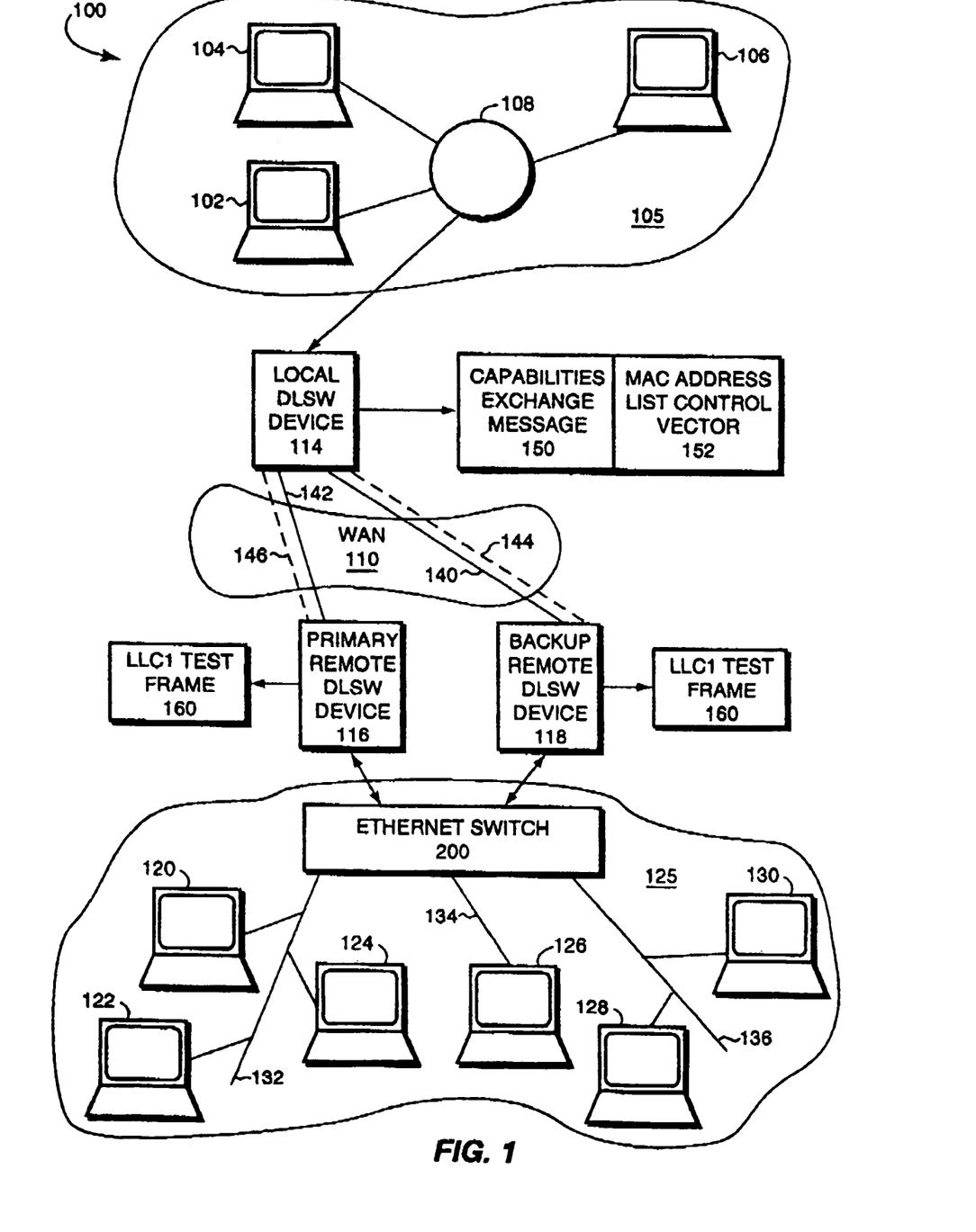
FIG. 1 is a schematic block diagram of a data link switching (DLSw) computer network configured to exchange data between end stations of a plurality of subnetworks through peer DLSw devices in accordance with a technique of the present invention.

FIG. 1 is a schematic diagram of a data link switching (DLSw) computer network 100 that is configured to exchange data between end stations in accordance with the present invention. The network 100 comprises a plurality of subnetworks 105, 125 interconnected by a wide area network (WAN) 110 to form a single, distributed network. Each subnetwork 105, 125 preferably includes servers (such as a host mainframe computer 106) and clients (such as an end station computer) connected by physical media, such as cables and network interface cards, in order to facilitate communication and sharing of resources, such as files or applications. Specifically, local subnetwork 105 includes local end stations 102–106 coupled to a local token ring local area network (LAN) 108, whereas remote subnetwork 125 incorporates a switched Ethernet network architecture for connecting remote end stations 120–130 through an Ethernet switch 200.

DLSw devices 114–118 are used to interconnect the subnetworks and facilitate communication and resource access among the local and remote endstations over the WAN 110. Communication among the end stations is effected by exchanging discrete packets or frames of data according to predefined protocols and services; an example of a connection-oriented service that may be used to ensure reliable communication between a source end station and a destination end station is an IEEE 802.2 Logical Link Control Type 2 (LLC2) connection service. The DLSw devices facilitate such communication by establishing peer relationships among themselves through the exchange of conventional Capabilities Exchange messages, as defined in RFC 1795. These peer devices further cooperate to establish a conventional reliable transport connection, such as a TCP connection, that enables multiplexing of LLC2 data frames over the TCP transport between the devices.

As a result, the DLSw devices 114–118 function as peers having logical and physical connections among them for interconnecting the subnetworks 105, 125 through the WAN 110 to form the DLSw network 100. In particular, DLSw device 114 is configured as a local DLSw device, while DLSw devices 116 and 118 are configured as remote DLSw devices. Moreover, DLSw device 116 is configured as a primary remote device and DLSw device 118 is configured as a backup remote device. Physical connections 140, 142 between the DLSw devices 114–118 are schematically shown as solid lines, whereas logical connections 144, 146 between the devices are schematically shown as broken lines. It should be noted that only one of the remote DLSw devices 116 and 118 has an active logical connection with DLSw device 114 at any point in time.

Figure 2:
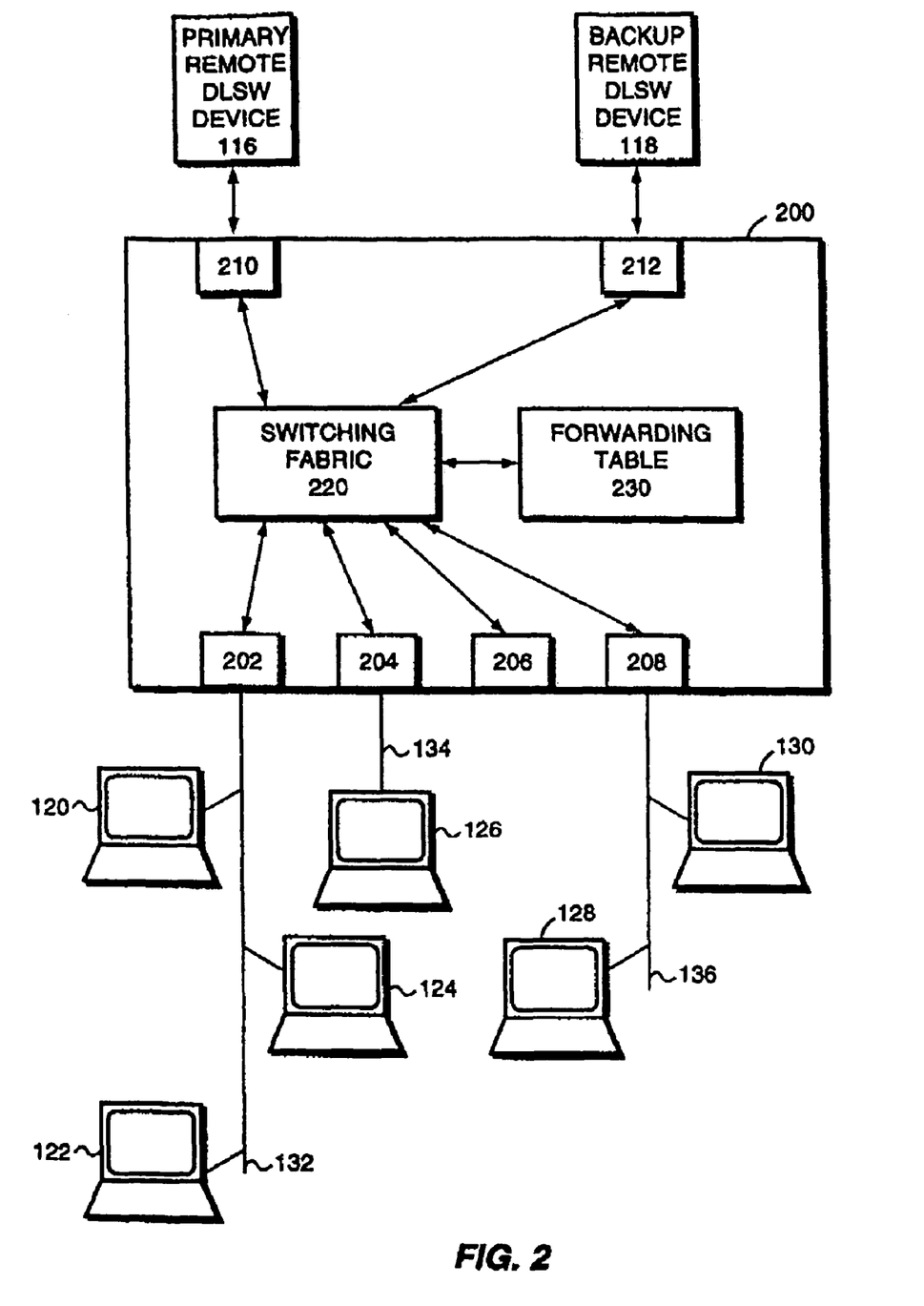
FIG. 2 is a schematic diagram of an Ethernet switch used for connecting multiple end stations in a subnetwork of the DLSw network.

FIG. 2 is a schematic block diagram of Ethernet switch 200 comprising multiple ports 202–212 for connecting the end stations 120–130 to the DLSw network 100 through a switching fabric 220. Each port may handle a plurality of medium access control (MAC) addresses from a plurality of end stations. The switch 200 dynamically maintains entries of a conventional forwarding table 230, which may be implemented as Content Addressable Memory, to keep track of which ports access certain MAC addresses. For example, port 202 is connected to remote LAN 132 which, in turn, couples end stations 120–124 to the switch 200; therefore, the forwarding table 230 includes three entries for port 202, with each entry storing the MAC address for a connected end station. As each end station 120–130 forwards frames through the switch, the port identifier (ID) of the port receiving the incoming frames and the MAC addresses of the transmitting end stations are recorded in the table 230.

The forwarding table 230 also stores the port IDs for those ports that connect the switch to DLSw devices 116, 118. Referring also to FIG. 1, assume a stream of LLC2 data frames are transmitted from local end station 106 to destination end station 120 over physical connection 142. Local DLSw device 114 forwards the LLC2 data frames over logical connection 146 to primary remote DLSw device 116 which, in turn, forwards the incoming frames to Ethernet switch 200 through port 210. Prior to switching the incoming frame through the fabric 220 to port 202 and onto destination 120, the switch records the connecting port ID (i.e., 210) of the incoming frame in its forwarding table 230, along with the source MAC address of the frame.

Assume now that a failure occurs with the primary remote DLSw device 116. Upon detecting the failure, the local DLSw device 114 terminates the logical connection 146 with primary remote DLSw device 116 and initiates logical peer connection 144 with the backup remote DLSw device 118. Upon further accepting the DLSw peer connection, the backup remote DLSw device 118 uses configuration information available in a data structure to determine those devices it can reach through this peer connection. In the preferred embodiment of the invention, the remote device 118 acquires this information by way of a conventional Capabilities Exchange message 150 having an appended control vector 152 that is sent from the local DLSw device 114. The control vector 152 is preferably a MAC Address List control vector (defined in RFC 1795) that is used by the backup remote DLSw device to "learn" those MAC addresses that can be reached through the new peer connection 144. Notably, no special support is needed in a peer remote DLSw device in order to utilize this control vector.

The backup remote DLSw device 118 parses the message to retrieve the control vector and, in response to examining the address list, generates test frame structures for each learned MAC address. In the illustrative embodiment, the generated test frame structure is preferably a conventional LLC1 TEST frame 160. Each learned MAC address comprises the source MAC address of each generated TEST frame, while the destination MAC address may be a group/multicast address to ensure propagation of the frame throughout the switched Ethernet subnetwork 125.

In accordance with one aspect of the present invention, the remote DLSw peer device sends at least one of the LLC TEST frames through the Ethernet switch 200 in order to force the switch to immediately update its forwarding table 230 with the appropriate port ID and source MAC address (es). Specifically, the backup remote DLSw device forwards each TEST frame through the Ethernet switch 200 and onto remote LANs 132–136. Prior to switching the TEST frames onto its ports, the switch 200 extracts the source MAC address from each TEST frame and updates its forwarding table 230 with (i) the port ID (i.e., backup remote device 118) of the incoming TEST frame, and (ii) the extracted MAC addresses of local end stations reachable through the backup port ID. If the extracted MAC addresses are previously stored in the table but associated with a different port ID then, in accordance with another aspect of the invention, the LLC TEST frames force the Ethernet switch 200 to immediately purge (remove) the old table entries, thereby substantially reducing overall recovery time by eliminating the delay associated with timing-out old entries of the switch.

Meanwhile, the local DLSw device 114 continues to monitor the state of the primary remote DLSw device 116. As soon as that latter device is operational, the local DLSw device 114 restores the logical connection 146 with the primary remote DLSw device 116 for exclusive communications with switched Ethernet subnetwork 125. The local DLSw device 114 subsequently "destroys" the logical connection 144 with the backup remote DLSw device 118. Yet, the Ethernet switch does not promptly forward frame traffic destined for the local subnetwork 105 through port 210 connected to the primary remote DLSw device 116; rather it continues to forward that traffic through port 212 coupled to the backup remote DLSw device 118 in accordance with the current entries of its forwarding table 230.

Because there is no longer a logical connection 144 between the backup remote DLSw device 118 and the local DLSw device 114, the frame traffic is discarded resulting in loss of connectivity. Furthermore, this loss of connectivity continues until the current forwarding table entries (particularly those specifying the backup path) have timed-out. The recovery time associated with transitioning from backup-to-primary remote device status (and vice versa) is thus variably increased by the time needed to purge old port ID and MAC address entries from the forwarding table 230 of the Ethernet switch 200.

System administrators have solved this problem by measuring the frequency (i.e., a time period) within which the Ethernet switch 200 receives information from an active remote DLSw device. If information is not received within the time period, the switch 200 purges old information from its forwarding table 230. The next time that a frame destined for one of these purged MAC addresses is received by the switch, the switch "floods" that frame to all of its ports, rather than directing it to any particular port. Such flooding continues until a response frame from the MAC address is received through the active remote DLSw device; at that point, the forwarding table is repopulated with new (correct) information. However, this solution is highly dependent on the effectiveness of the measured time period. That is, if the time period is shorter than an optimal time, the switch will unnecessarily flood its ports with frames, thereby impeding network performance. If the period is longer than the optimal time period, delayed responses from the local subnetwork 105 may affect user activities on the network.

As noted, when Ethernet switch 200 receives frames sourced from the local subnetwork 105 through a port that is different from the one recorded in its table 230, the switch deletes the old port's entries from the table and inserts the new port ID and the incoming source MAC addresses of the frames. The loss of connectivity and recovery time problem may thus be solved when a local end station, such as host mainframe 106, transmits frames to a remote end station 120–130. However, a server (such as mainframe 106) is not generally configured to "look" for a client (such as a remote end station); typically the client issues service requests to the server which responds with the requested service.

An exception involves configuring a conventional "connect-out" function in the host mainframe 106 that transmits frames to a remote end station; a system administrator may configure the mainframe with this function to take advantage of normal Ethernet switch operation to reconfigure the forwarding table 230. Yet when the primary remote DLSw device 116 is reactivated, there may be no traffic from local subnetwork 105 which traverses local DLSw device 114 to newly-activated primary remote DLSw device 116 over logical connection 146 and onto switch 200, thereby causing the switch to update its forwarding table 230. Since the DLSw peer devices 114, 116 do not generally source frames, a local end station on subnetwork 105 must source an explorer frame that is forwarded through the Ethernet switch, causing it to update its forwarding table 230 or, alternatively, the Ethernet switch 200 must time out its forwarding table entry. Otherwise, the switch 200 continues to send frames destined to MAC addresses on subnetwork 105 through its port 212 on which the disconnected backup remote DLSw device is attached. Again, this leads to loss of connectivity.

When the primary remote DLSw device 116 is reactivated, the local and primary remote DLSw devices exchange the conventional Capabilities Exchange message 150 over the logical connection 146. Using the novel technique described herein, the primary remote DLSw device 116 creates LLC TEST frames 160 using the MAC addresses from the control vector 152 of the exchanged message as source MAC addresses. The primary remote device 116 sends the TEST frames through port 210 of the Ethernet switch 200, which records the source MAC addresses and port ID 210 in its table 230. Thus, in accordance with the present invention, the novel technique forces the Ethernet switch to update its forwarding table in connection with its frame forwarding mechanism.

Figure 3:
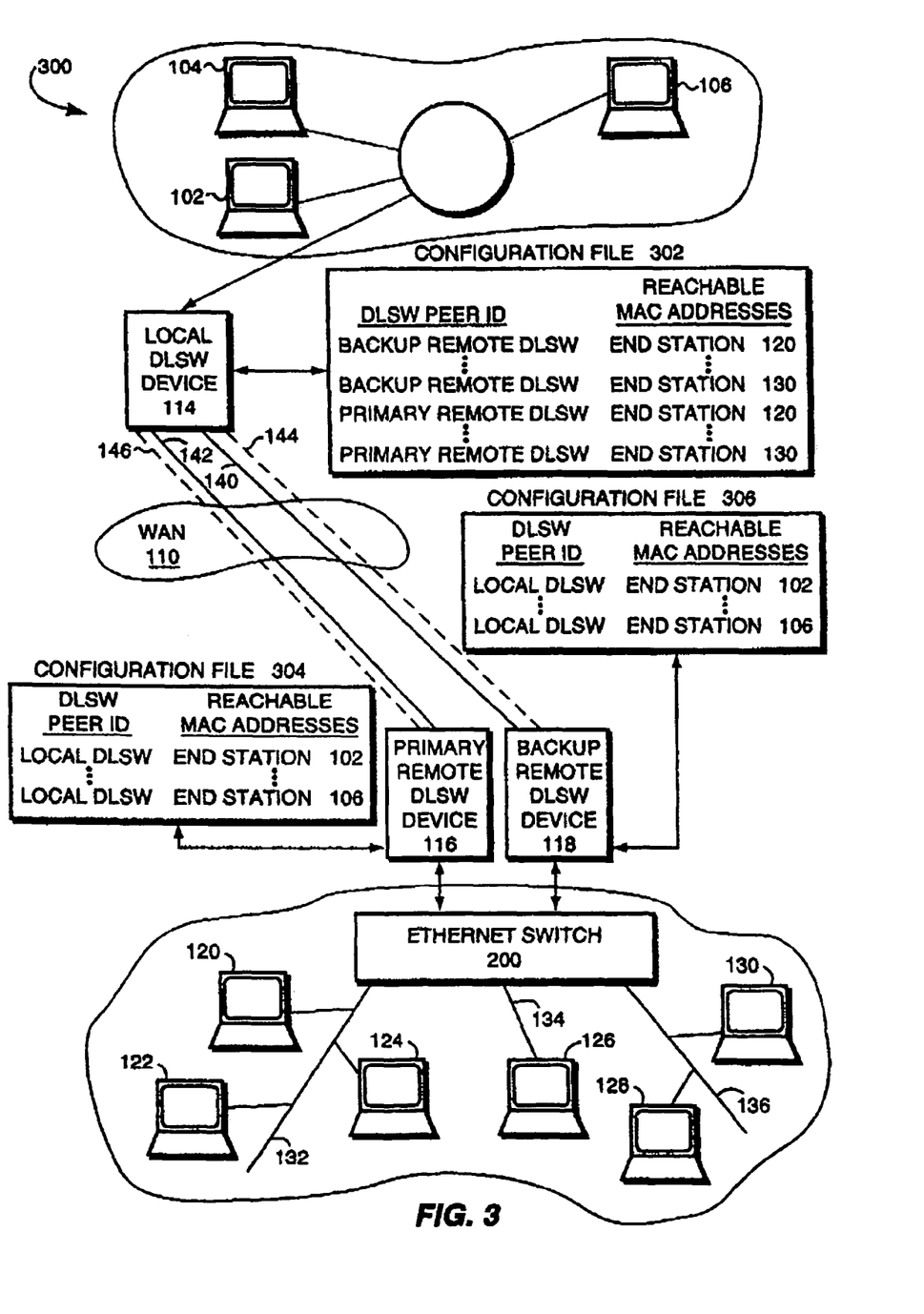
FIG. 3 is a schematic block diagram of an alternative embodiment of the invention wherein a list of statically-configured addresses are stored in configuration files of the peer DLSw devices for use in accordance with the present invention.

While there has been shown and described an illustrative embodiment for improving the interaction between a backup remote DLSw device coupled to a remote subnetwork having an Ethernet switch and a local DLSw device coupled to a local subnetwork of a DLSw network, it is to be understood that various other adaptations and modifications may be made within the spirit and scope of the invention. For example in an alternative embodiment of the present invention, a list of MAC addresses, along with the peer ID of the DLSw peer through which these MAC addresses may be reached, are statically configured within the primary and backup remote devices by a system administrator. FIG. 3 is a schematic block diagram of the alternative DLSw network embodiment 300 wherein the list of statically-configured peer ID and reachable MAC addresses are stored in configuration files of respective DLSw devices. Specifically, each DLSw device 114–118 has a configuration file 302–306 that specifies all MAC addresses accessible through peer DLSw devices with which it has physical connections. When a logical DLSw peer connection 144, 146 is established, the remote DLSw device 116, 118 scans the list of statically-configured MAC addresses to determine whether an address corresponds to the peer ID of the newly-connected local DLSw peer. If so, LLC TEST frames are forwarded through the Ethernet switch 200 to force the switch to modify its forwarding table, as described above.

The foregoing description has been directed to specific embodiments of this invention. It will be apparent, however, that other variations and modifications may be is made to the described embodiments, with the attainment of some or all of their advantages. Therefore, it is the object of the appended claims to cover all such variations and modifications as come within the true spirit and scope of the invention.

What is claimed is:

1. In a data link switching (DLSw) network, a method for improving interaction between a first remote DLSw device coupled to a remote subnetwork including a switch having a forwarding table and a local DLSw device coupled to a local subnetwork including local end stations, the local DLSw device establishing a first logical peer connection with the first remote DLSw device in response to a failure of a second remote DLSw device, the method comprising the steps of:

at the first remote DLSw device, using configuration information to determine the local end stations that are reachable through the first logical DLSw peer connection;

generating one or more test frames at the first remote DLSw device, the test frames having source addresses comprising addresses of the reachable local end stations;

forwarding the test frames through the switch to force the switch to immediately update the forwarding table with (i) a port identifier (ID) of a port receiving the test frames at the switch and (ii) the source addresses of those frames.

2. The method of claim 1 wherein destination addresses of the frames are group/multicast addresses and wherein the source and destination addresses are medium access control (MAC) addresses.

3. The method of claim 2 wherein the test frames are Logical Link Control Type 1 (LLC1) TEST frames.

4. The method of claim 3 wherein the switch is an Ethernet switch.

5. The method of claim 4 wherein the step of using configuration information comprises the step of learning the MAC addresses of the reachable local end stations via a MAC address list control vector of a DLSw Capabilities Exchange message transmitted by the local DLSw device.

6. The method of claim 5 further comprising the steps of:
at the local DLSw device, monitoring the second remote DLSw device to determine when it becomes operational;
establishing a second logical connection between the local DLSw device and the second remote DLSw device when the second remote DLSw device becomes operational;
destroying the first logical connection between the local DLSw device and the first remote DLSw device.

7. The method of claim 6 further comprising the steps of:
issuing the DLSw Capabilities Exchange message including the MAC address list control vector from the local DLSw device over the second logical connection to the second remote DLSw device;
creating, at the second remote DLSw device, the LLC1 TEST frames using the MAC addresses from the control vector as source MAC addresses of the frames;
sending the LLC1 TEST frames from the second remote device through an incoming port of the Ethernet switch; and
recording the source MAC addresses of the frame and a port ID of the incoming port in the forwarding table, thereby forcing the Ethernet switch to update the forwarding table.

8. The method of claim 4 wherein the step of using configuration information comprises the steps of:
scanning a list of statically-configured MAC addresses located within a configuration file of the first remote DLSw device; and
determining whether a MAC address corresponds to the port ID of the local DLSw device.

9. In a data link switching (DLSw) network, apparatus for improving interaction between a first remote DLSw device coupled to a remote subnetwork including remote end stations and a local DLSw device coupled to a local subnetwork including local end stations, the local DLSw device establishing a first logical peer connection with the first remote DLSw device in response to a failure of a second remote DLSw device, the apparatus comprising:
a switch having a plurality of ports coupled to the remote DLSw devices and the remote end stations, the switch including a forwarding table for storing addresses of the local and remote end stations accessible through the ports;
a configuration data structure stored at the first remote DLSw device, the configuration data structure used to determine the local end stations that are reachable through the first logical DLSw peer connection;
at least one test frame structure generated by the first remote DLSw device, the test frame structure having a source address comprising an address of a reachable local end station; and
means for forwarding the test frame structure from the first remote DLSw device and through the switch to force the switch to immediately update the forwarding table with (i) a port identifier (ID) of a port receiving the test frame structure at the switch and (ii) the source address of the test frame structure.

10. The apparatus of claim 9 wherein the switch is an Ethernet switch.

11. The apparatus of claim 10 wherein a destination address of the test frame structure is a group/multicast address, and wherein the source and destination addresses are medium access control (MAC) addresses.

12. The apparatus of claim 11 wherein the test frame structure is a Logical Link Control Type 1 (LLC1) TEST frame.

13. The apparatus of claim 12 wherein the configuration data structure is a MAC address list control vector of a DLSw Capabilities Exchange message transmitted by the local DLSw device.

14. The apparatus of claim 13 wherein the first remote DLSw device is a backup remote DLSw device and wherein the second remote DLSw device is a primary remote DLSw device.

15. The apparatus of claim 13 wherein the first remote DLSw device is a primary remote DLSw device and wherein the second remote DLSw device is a backup remote DLSw device.

16. The apparatus of claim 12 wherein the configuration data structure is a configuration file containing a list of statically-configured MAC addresses.

17. In a data link switching (DLSw) network, apparatus for improving interaction between a first remote DLSw device coupled to a remote subnetwork including a switch having a forwarding table and a local DLSw device coupled to a local subnetwork including local end stations, the local DLSw device establishing a first logical peer connection with the first remote DLSw device in response to a failure of a second remote DLSw device, the apparatus comprising:
a configuration data structure stored at the first remote DLSw device, the configuration data structure being used to determine the local end stations that are reachable through the first logical DLSw peer connection;
at least one test frame structure generated by the first remote DLSw device, the test frame structure having a source address comprising an address of a reachable local end station; and
a forwarding mechanism for forwarding the test frame structure from the first remote DLSw device and through the switch to force the switch to immediately update the forwarding table with (i) a port identifier (ID) of a port receiving the test frame structure at the switch and (ii) the source address of the test frame structure.

18. The apparatus of claim 17 wherein a destination address of the test frame is a group/multicast address, and wherein the source and destination addresses are medium access control (MAC) addresses.

19. The method of claims 17 wherein the test frame is a Logical Link Control Type 1 (LLC1) TEST frame.

20. The apparatus of claim 17 wherein the switch is an Ethernet switch.

21. In a data link switching (DLSw) network, a method for improving interaction between a first remote DLSw device coupled to a remote subnetwork including a switch having a forwarding table and a local DLSw device coupled to a local subnetwork including local end stations, the local DLSw device establishing a first logical peer connection with the first remote DLSw device in response to a failure of a second remote DLSw device, the method comprising the steps of:
acquiring configuration information by way of a Capabilities Exchange message having an appended control vector;
at the first remote DLSw device, using the configuration information to determine the local end stations that are reachable through the first logical DLSw peer connection;

generating one or more test frames at the first remote DLSw device, the test frames having source addresses having addresses of the reachable local end stations; and forwarding the test frames through the switch to force the switch to immediately update the forwarding table with (i) a port identifier (ID) of a port receiving the test frames at the switch and (ii) the source addresses of those frames.

22. A method as recited in claim 21 wherein the control vector is a media access control (MAC) address list control vector.

23. In a first data link switching (DLSw) device, a method for improving interaction between the first DLSw device and a second DLSw device, the method comprising the steps of:

acquiring configuration information by way of a Capabilities Exchange message;

using the configuration information to determine end stations that are reachable through a logical DLSw peer connection with the second DLSw device;

generating one or more test frames, the test frames having source addresses having addresses of the reachable end stations; and forwarding the test frames towards a switch containing a forwarding table to force the switch to immediately update the forwarding table with (i) a port identifier (ID) of a port receiving the test frames at the switch and (ii) the source addresses of those frames.

24. An apparatus for improving interaction between a first data link switching (DLSw) device and a second DLSw device, the first DLSw device establishing a first logical peer connection with the second DLSw device, the apparatus comprising:

a configuration data structure having configuration information used to determine end stations that are reachable through the first logical peer connection;

at least one test frame structure generated by the first DLSw, the test frame having a source address having an address of a reachable end station; and means for forwarding the test frame structure towards a switch having a forwarding table to force the switch to immediately update the forwarding table with (i) a port identifier (ID) of a port receiving the test frames at the switch and (ii) the source addresses of those frames.

25. An apparatus for improving interaction between a first data link switching (DLSw) device and a second DLSw device, the first DLSw device establishing a first logical peer connection with the second DLSw device, the apparatus comprising:

means for acquiring configuration information by way of a Capabilities Exchange message;

means for using the configuration information to determine end stations that are reachable through a logical DLSw peer connection with the second DLSw device;

means for generating one or more test frames, the test frames having source addresses having addresses of the reachable end stations; and means for forwarding the test frames towards a switch containing a forwarding table to force the switch to immediately update the forwarding table with (i) a port identifier (ID) of a port receiving the test frames at the switch and (ii) the source addresses of those frames.

* * * * *